US006253204B1

(12) United States Patent
Glass et al.

(10) Patent No.: US 6,253,204 B1
(45) Date of Patent: Jun. 26, 2001

(54) RESTORING BROKEN LINKS UTILIZING A SPIDER PROCESS

(75) Inventors: Bob Glass, Los Gatos; Jakob Nielsen, Atherton; BJ Fogg, Stanford, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 08/992,407

(22) Filed: Dec. 17, 1997

(51) Int. Cl.[7] ....................................... G06F 17/00
(52) U.S. Cl. ................... 707/102; 707/3; 707/7; 707/10; 707/104; 707/501; 707/513; 707/533
(58) Field of Search ................. 707/3, 10, 104, 707/501, 513, 533, 532, 7; 709/200, 203, 218, 219, 223, 224; 370/352; 395/701; 345/333, 352, 357; 714/47

(56) References Cited

U.S. PATENT DOCUMENTS

| 5,761,683 | * | 6/1998 | Logan | 707/513 |
| 5,822,533 | * | 10/1998 | Saito et al. | 709/214 |
| 5,835,712 | * | 11/1998 | DuFresne | 709/203 |
| 5,875,302 | * | 2/1999 | Ohban | 709/225 |
| 5,884,309 | * | 3/1999 | Vanechanos, Jr. | 707/10 |
| 5,894,554 | * | 4/1999 | Lowery | 707/10 |
| 5,907,680 | * | 5/1999 | Nielsen | 709/203 |
| 5,958,008 | * | 9/1999 | Pogrebisky et al. | 709/223 |
| 5,974,572 | * | 10/1999 | Weinberg et al. | 714/47 |
| 5,999,929 | * | 12/1999 | Goodman | 707/7 |
| 6,021,439 | * | 2/2000 | Turek et al. | 709/224 |
| 6,035,330 | * | 3/2000 | Astiz et al. | 709/218 |
| 6,049,799 | * | 4/2000 | Mangat et al. | 707/10 |

OTHER PUBLICATIONS

The Internet, "SiteSweeper helps clean up Web management" by Kim S. Nash; ComputerWorld, pp. 1–2, Oct. 7, 1996.*

\* cited by examiner

Primary Examiner—Thomas Black
Assistant Examiner—Diane Mizrahi
(74) Attorney, Agent, or Firm—McDermott, Will & Emery

(57) ABSTRACT

Information links, such as hypertext links, found in network based documents, such as those found on the World Wide Web, sometimes break, i.e. fail to result in retrieval the desired document. Techniques are described to record information about such broken links and to provide relatively current information to a user whether a link was broken or, if previously broken, has been restored. A centralized broken link service is also described by which information about the status of links on the network can be gathered. A spider can be utilized to periodically check on whether links reported as broken have been restored.

20 Claims, 23 Drawing Sheets

1200

| 1210 | 1220 | 1230 | 1240 |
|---|---|---|---|
| DOCUMENT IDENTIFIER | LINK IDENTIFIER | NUMBER OF ATTEMPTS | NUMBER ATTEMPTS SUCCESSFUL |

Figure 12A

| 1250 | 1260 | 1270 |
|---|---|---|
| DATETIME FIRST ATTEMPT | DATETIME LAST ATTEMPT | LIST OF USERS REPORTING BROKEN LINK |

RESTORING BROKEN LINKS UTILIZING A SPIDER PROCESS

BACKGROUND OF THE INVENTION

1. Field of the Invention

The invention is directed to information systems and, more particularly, to the indication of broken and healed hypertext links in a network, such as the World Wide Web.

2. Description of Related Art

Large information networks, such as the World Wide Web are well-known in the art. Documents stored in such an information system contain hypertext links to related information.

3. The Problems

Navigating information systems such as the World Wide Web by using links can be a frustrating experience because many of these weblinks are "broken", that is, they do not connect the user to the intended destination page. Instead, users receive an error message, such as "file not found." Such errors create a suboptimal user experience when using these information systems.

Solving this problem is not easy. It is a time consuming and tedious job for the authors or maintainers of web pages to continually verify that all of the links in all of their documents are working.

SUMMARY OF THE INVENTION

The problems of the prior art are overcome by providing methods, apparatus, systems and computer program products for monitoring "file not found" error messages. When a user receives such an error message, it captures the URL and link information for the broken link and it generates a message to the website maintaining the document, that the link is not working. The display of such a broken link is modified at least at the client side of a client server interaction. Preferably, at the server's side, the code for the web page that has the broken link is retrieved and modified so that the broken link has a new visual appearance. Typically, this is modified by changing the mark-up language utilized for the page, such as HTML. The new visual appearance could take various forms. In this way, anyone who visits a web page after the system generates the replacement web page will see that the link was broken. The unique visual indication of a broken link will disappear whenever someone, typically a website owner or maintainer who has just fixed the problem clicks on the once-broken link and the destination page arrives successfully. Once this occurs, the visual and marker associated with the broken link is removed by generating a new page with the link displayed in the normal manner. Alternatively, a link once broken but currently functioning (a healed link) could be displayed in a manner designed to indicate to a user that the link has been healed.

The foregoing and other features, aspects and advantages of the present invention will become more apparent from the following detailed description of the present invention when taken in conjunction with the accompanying drawings.

BRIEF DESCRIPTION OF THE DRAWINGS

The objects, features and advantages of the system of the present invention will be apparent from the following description in which:

FIGS. 12A and 12B represent an exemplary database layout for recording broken links and for gathering information on how well maintained a server site is.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1A:
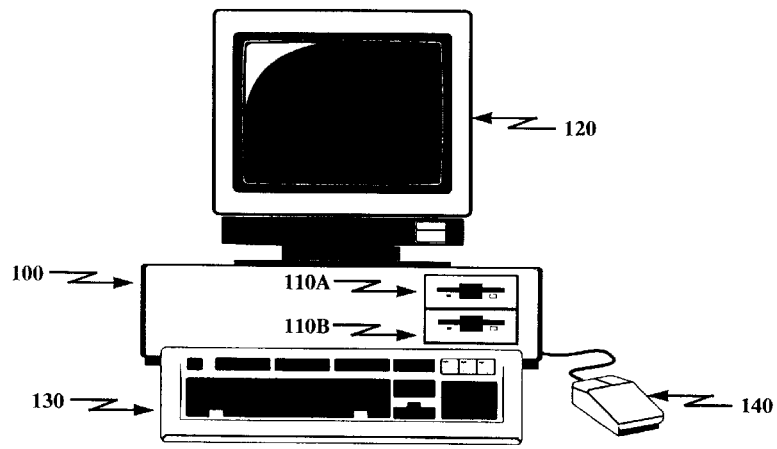
FIG. 1A is a view of exemplary computer system suitable for use in carrying out the invention.

FIG. 1A illustrates a computer of a type suitable for carrying out the invention. Viewed externally in FIG. 1A, a computer system has a central processing unit 100 having disk drives 110A and 110B. Disk drive indications 110A and 110B are merely symbolic of a number of disk drives which might be accommodated by the computer system. Typically, these would include a floppy disk drive such as 110A, a hard disk drive (not shown externally) and a CD ROM drive indicated by slot 110B. The number and type of drives varies, typically, with different computer configurations. The computer has the display 120 upon which information is displayed. A keyboard 130 and a mouse 140 are typically also available as input devices. Preferably, the computer illustrated in FIG. 1A is a SPARC™ workstation from Sun Microsystems, Inc.

Figure 1B:
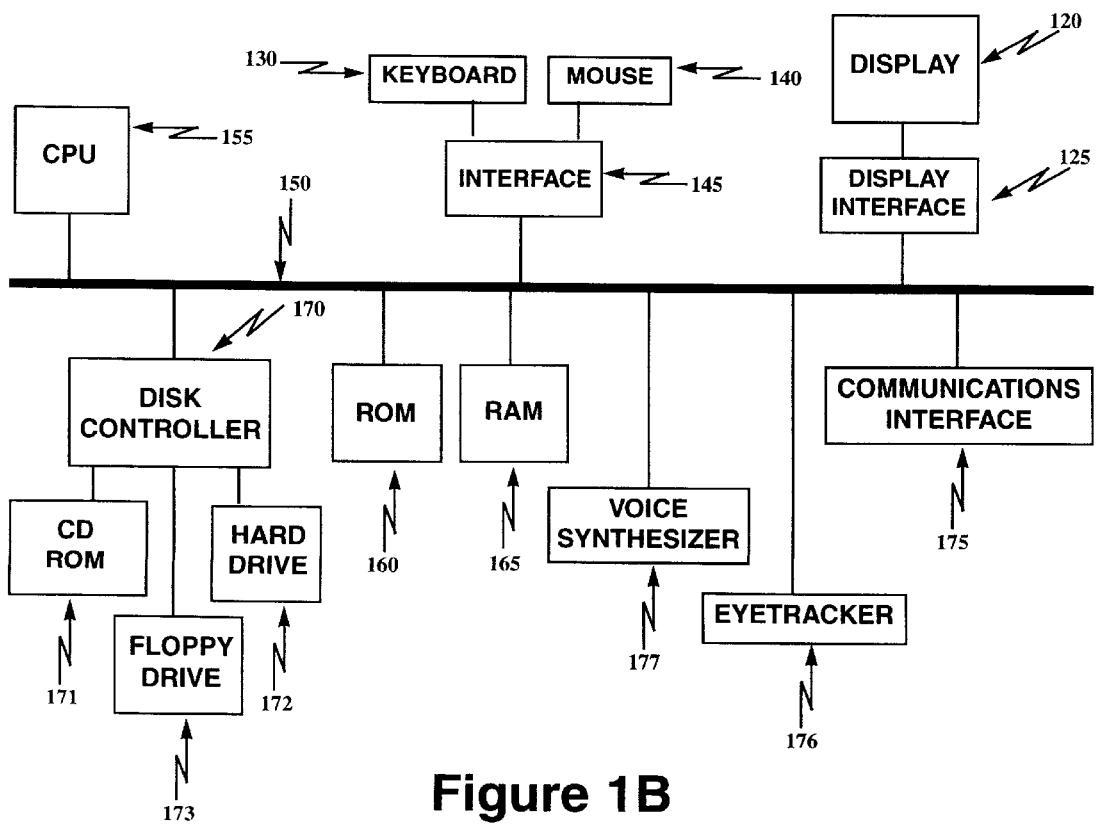
FIG. 1B is a block diagram of an exemplary hardware configuration of the computer of FIG. 1.

FIG. 1B illustrates a block diagram of the internal hardware of the computer of FIG. 1A. A bus 150 serves as the main information highway interconnecting the other components of the computer. CPU 155 is the central processing unit of the system, performing calculations and logic operations required to execute programs. Read only memory (160) and random access memory (165) constitute the main memory of the computer. Disk controller 170 interfaces one or more disk drives to the system bus 150. These disk drives may be floppy disk drives, such as 173, internal or external hard drives, such as 172, or CD ROM or DVD (Digital Video Disks) drives such as 171. A display interface 125 interfaces a display 120 and permits information from the bus to be viewed on the display. An eyetracker 176 and a voice synthesizer 177 (with usual interfaces) are used in clearing error messages. Communications with external devices can occur over communications port 185.

Figure 1C:
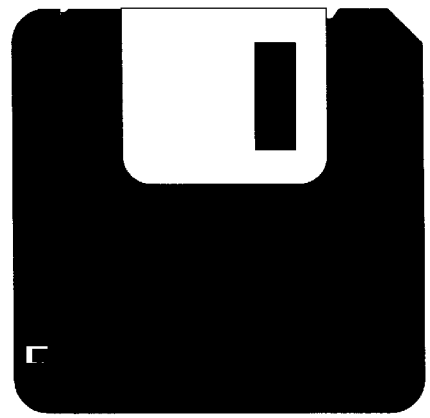
FIG. 1C is an illustration of an exemplary memory medium suitable for storing program and data information in accordance with the invention.

FIG. 1C illustrates an exemplary memory medium which can be used with drives such as 173 in FIG. 1B or 110A in FIG. 1A. Typically, memory media such as a floppy disk, or a CD ROM, or a Digital Video Disk will contain the program information for controlling the computer to enable the computer to perform its functions in accordance with the invention.

Figure 1D:
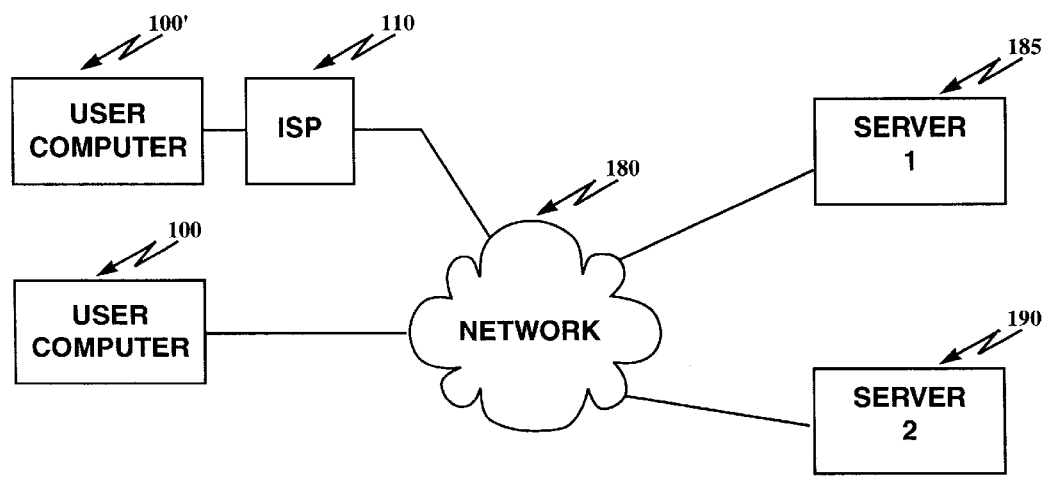
FIG. 1D is a block diagram of a network architecture suitable for carrying data and programs in accordance with some aspects of the invention.

FIG. 1D is a block diagram of a network architecture suitable for carrying data and programs in accordance with some aspects of the invention. A network 180 serves to connect a user computer 100 with either a server 185 or, alternatively, with server 190 for the download of program and data information.

Figure 2:
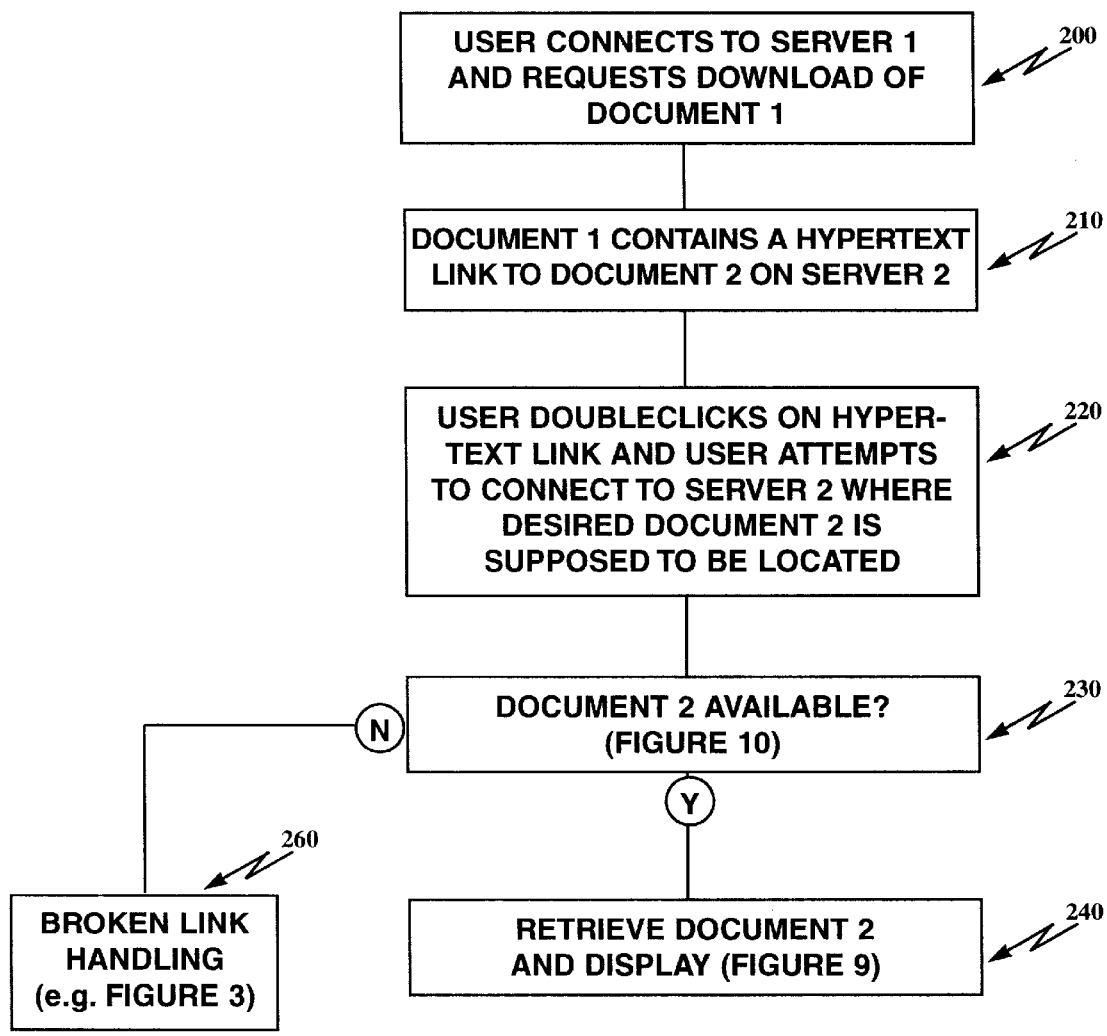
FIG. 2 is a flow chart of an exemplary process used for handling broken information links in accordance with one embodiment of the invention.

FIG. 2 is a flow chart of an exemplary process used for handling broken information links in accordance with one embodiment of the invention. As shown therein, a user, such as user 100 or 100' of FIG. 1D connects to server 1 (185) and requests download of a document, such as document 1 (200). For purposes of this illustration, document 1 contains a hypertext link to document 2 located on server 2 (210). This could be, for example, server 2 as shown at 190 in FIG. 1D. If a user desires to retrieve document 2, the user double clicks on an information link, such as a hypertext link, and a client process attempts to connect to server 2 where the desired document 2 is supposed to be located (220). If document 2 is available (230-Y), document 2 is retrieved and displayed (240). However, if document 2 is not available (230-N), the information link is considered broken, at least for the moment, and the broken link handling described more hereinafter is pursued (260).

There are several reasons why a document (sometimes called file or page) may not be available. For example, a communications link linking the requesting user to a server may be down. Alternatively, the server itself may be down for maintenance or because of malfunction. It may also be that document 2 has been removed from the server or the address for document 2 on that server has been changed. It may also be that document 2 has been moved to another server. As another example, the information link pointing to document 2 may contain a typographical error (in the HTML of document 1) which does not accurately point to document 2.

Some of these reasons for an information link being broken are merely temporary. Others, are substantially permanent.

Figure 3:
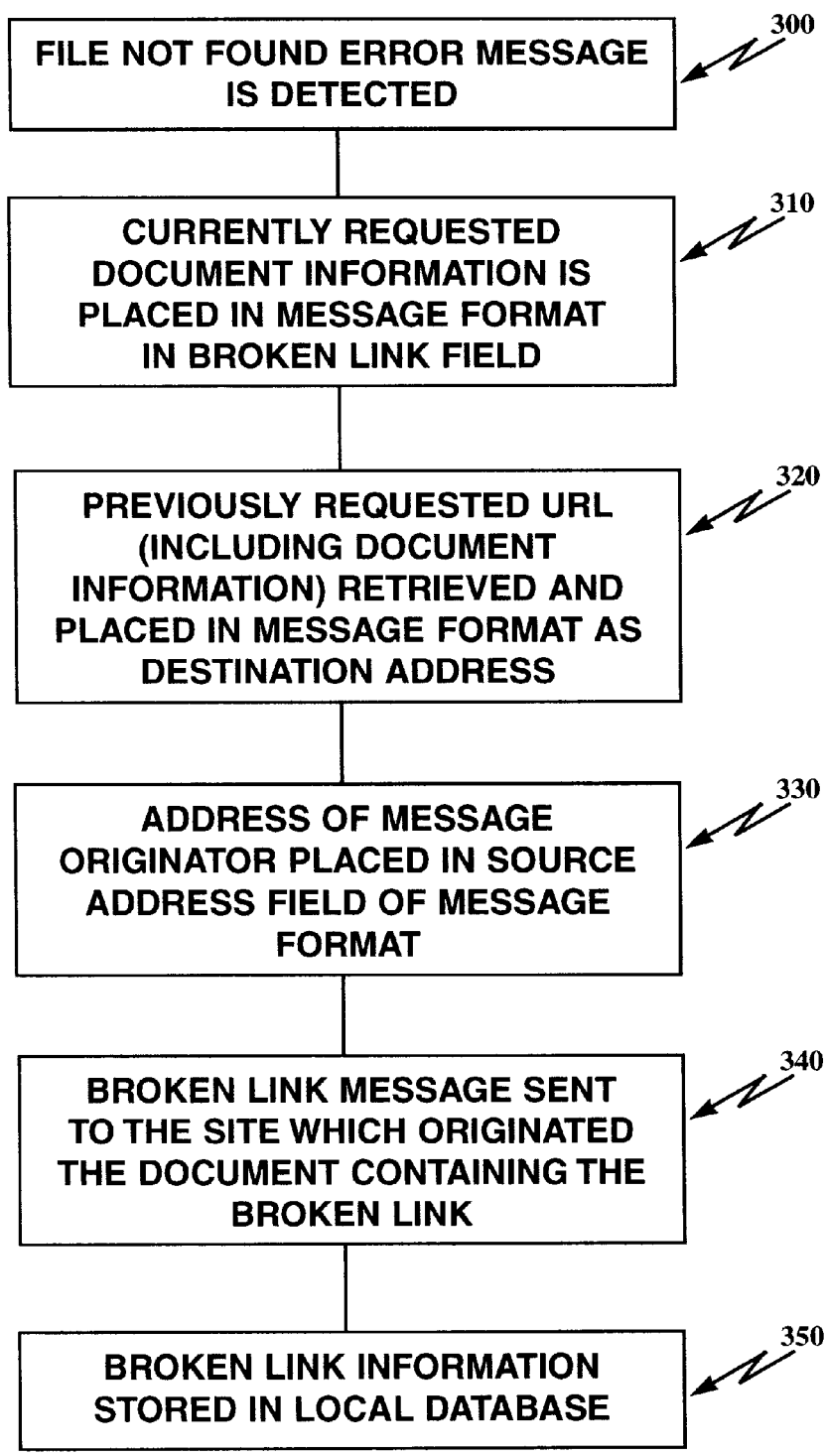
FIG. 3 is a flow chart of an exemplary process for reporting a broken link.
Figure 4:
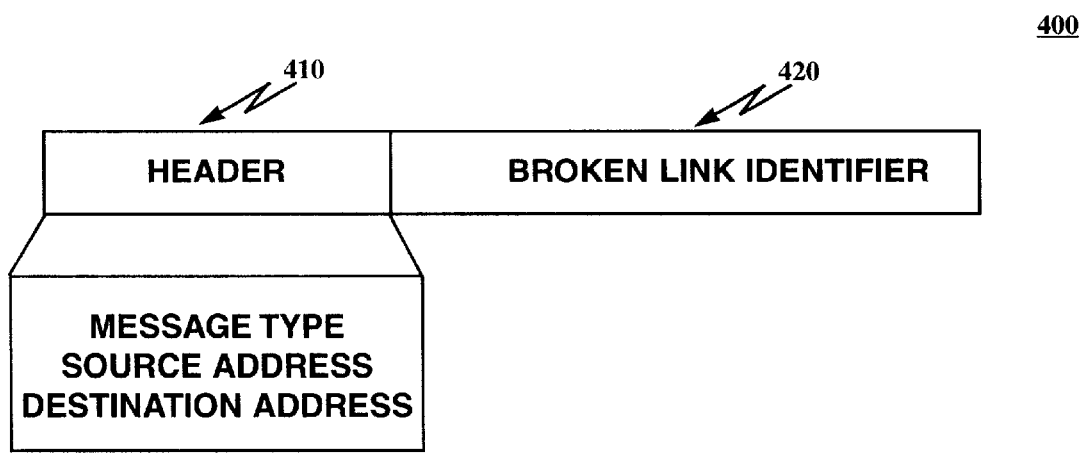
FIG. 4 is an illustration of an exemplary message format for use in reporting broken and healed links in accordance with one embodiment of the invention.

FIG. 3 is a flow chart of an exemplary process for reporting a broken link. A document not found error message is generated, typically, in one of two ways. Either, a message is returned from the server containing the document requested indicating that it did not find the requested document or, alternatively, there may be no response at all in which case the local client process will detect a failure to respond and display a document not found error message. When such an error message is detected (300) the currently requested document information is placed in a message format, such as that shown in FIG. 4, in the broken link field (310). The currently requested document information is typically information formatted in a uniform resource locator (URL) format such as utilized on the World Wide Web. The URL information contains information identifying the server as well as the document located on the server to be retrieved. An information link in a document retrieved from a server typically contains the URL of the document pointed to so that the user may connect to the server on which that document resides and retrieve the document. When pursuing information links, it is customary to maintain a list of recently visited information links (i.e. their URL's). Thus, one can easily access the previously requested information link and place it in the message format, such as shown in FIG. 4 as the destination address (320). The network address of the user (or client) which receives the file not found error message is placed in the source address field of the message format of FIG. 4 (330). Then a broken link message is sent to the site which originated the page containing the broken link (340). Preferably, broken link information is concurrently stored in a broken link database such as that shown in FIG. 6.

FIG. 4 is an illustration of an exemplary message format for use in reporting broken and healed links in accordance with one aspect of the invention. The message is formatted as a packet 400 including a header 410 and a broken link identifier 420. The header portion of the message format includes, preferably, at least three components. First, a message type which distinguishes at least two types of messages, namely a broken link report and a repaired or healed link report. The source address, or the address of the user or process reporting the broken link is placed in the source address portion of the header. The destination address is the address of the server from which the document containing the broken link was retrieved. The broken link identifier 420 contains the URL of the document, the retrieval of which failed.

Figure 5:
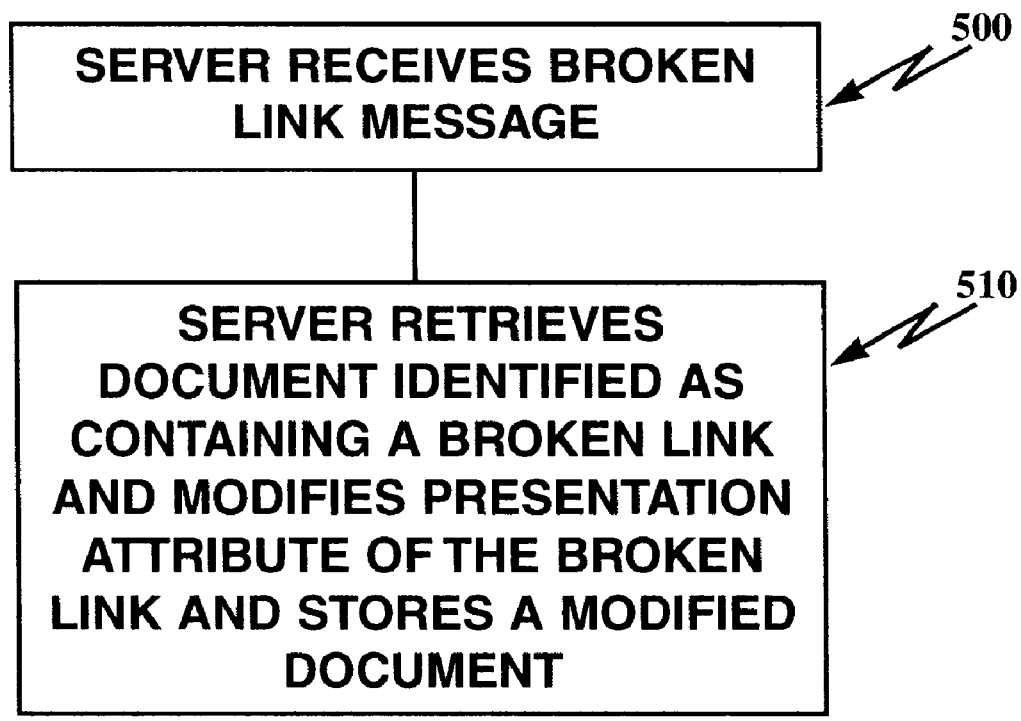
FIG. 5 is a flow chart of an exemplary process for modifying the presentation or display attributes of a broken link at a server in accordance with one aspect of the invention.

FIG. 5 is a flow chart of an exemplary process for modifying display of a broken link at a server in accordance with one aspect of the invention. When a server receives a broken link message from the user as discussed in conjunction with item 340 of FIG. 3, (500), the server retrieves the document identified as containing a broken link and modifies a presentation attribute of the broken link and stores a modified document (510). As shown in FIG. 4, the destination address for the message is the server in which the document is located which contains a broken link. When that document is retrieved, it is scanned to identify text which corresponds to the broken link identified in field 420 of the message. When the information link is identified, its attributes are modified by modifying the HTML code associated with the information link to change the presentation. For example, the color can change from its normal presentation (commonly blue) to a color indicating a broken link, such as red or yellow. Alternatively, the presentation of the link which has been reported broken can be changed by placing an icon before, after or both before and after the information link to identify the fact that the link has been determined to be broken. Once the HTML code has been modified, the modified code is stored on the server, so that any user accessing that document and displaying it will receive a document which has been modified to highlight the fact that the particular information link has been determined to be broken.

Figure 6:
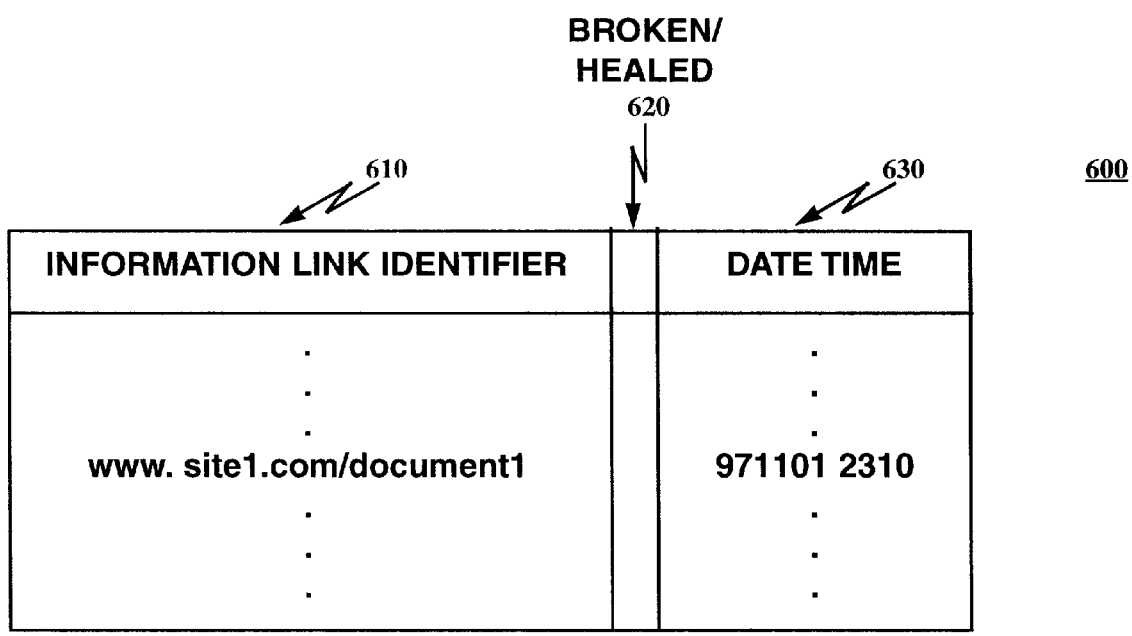
FIG. 6 is a diagram of an exemplary database layout for a client process in accordance with one aspect of the invention.

FIG. 6 is a diagram of an exemplary database layout for a client process in accordance with one aspect of the invention. As discussed in conjunction with FIG. 3, at 350, broken link information identified by a user is stored in a local database. Database layout 600 is an exemplary form of storing that information. The information contains a field 610 listing broken links and a field 620 showing the date and time at which the broken status of the link was identified. The use of this database in conjunction with the client process permits a local user to have the functionality of broken link identification whether or not servers are equipped to modify the presentation of a document containing a broken link. The data field 620 as shown in FIG. 6 can be utilized for implementing various clean-up policies for removing stale entries from the database, should that be desired.

Figure 7:
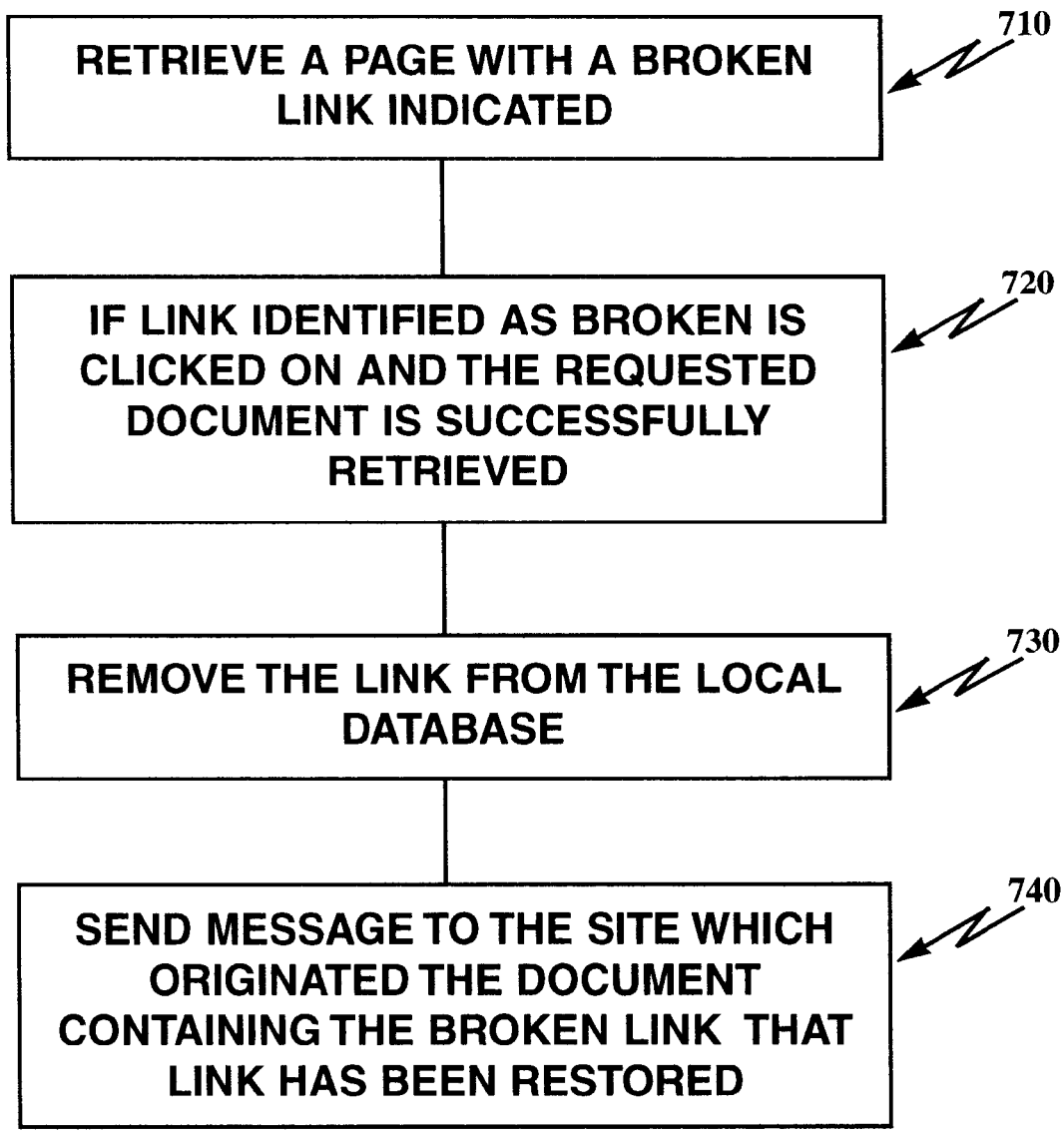
FIG. 7 is a flow chart of an exemplary process for removing a broken link indication at a client when the link is healed.

FIG. 7 is a flow chart of an exemplary process for removing a broken link indication at a client when the link is healed. When a page has been retrieved which contains a broken link (710) as indicated by, for example, its presence in the local database shown in FIG. 6 or by virtue of presentation from a server equipped to identify broken links, when a user clicks on a link identified as broken, if the requested document is successfully retrieved (720), the link will be removed from the local database of broken links (730) shown in FIG. 6 and a message will be formulated and sent to the site which originated the document containing the broken link that the link has been repaired (740) using the message format of FIG. 4. If the server is not equipped to mark links which have been broken and healed, the message will simply be ignored. However, the broken indication will be removed from the local database so that the information link which was previously listed and displayed broken, will now be displayed as normal.

Figure 8:
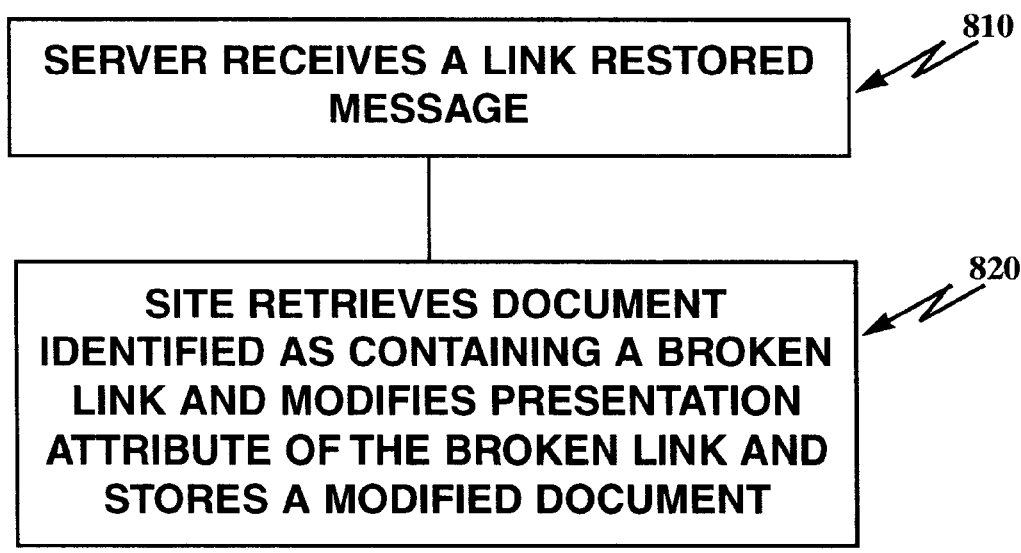
FIG. 8 is a flow chart of an exemplary process for removing a broken link indication at a server when the link is healed.

FIG. 8 is a flow chart of an exemplary process for removing a broken link indication at a server when the link is healed. When a server receives the link restored message (810), using, for example, the message format of FIG. 4, the site retrieves the document identified as containing a broken link and modifies the presentation attribute of the broken link and stores a modified (restored) document (820).

When a link is healed, it is preferable to display the link in a modified form which distinguishes it from links which have never been broken and from broken links. One form of displaying a healed link is discussed in conjunction with FIG. 15, hereinafter.

Figure 9:
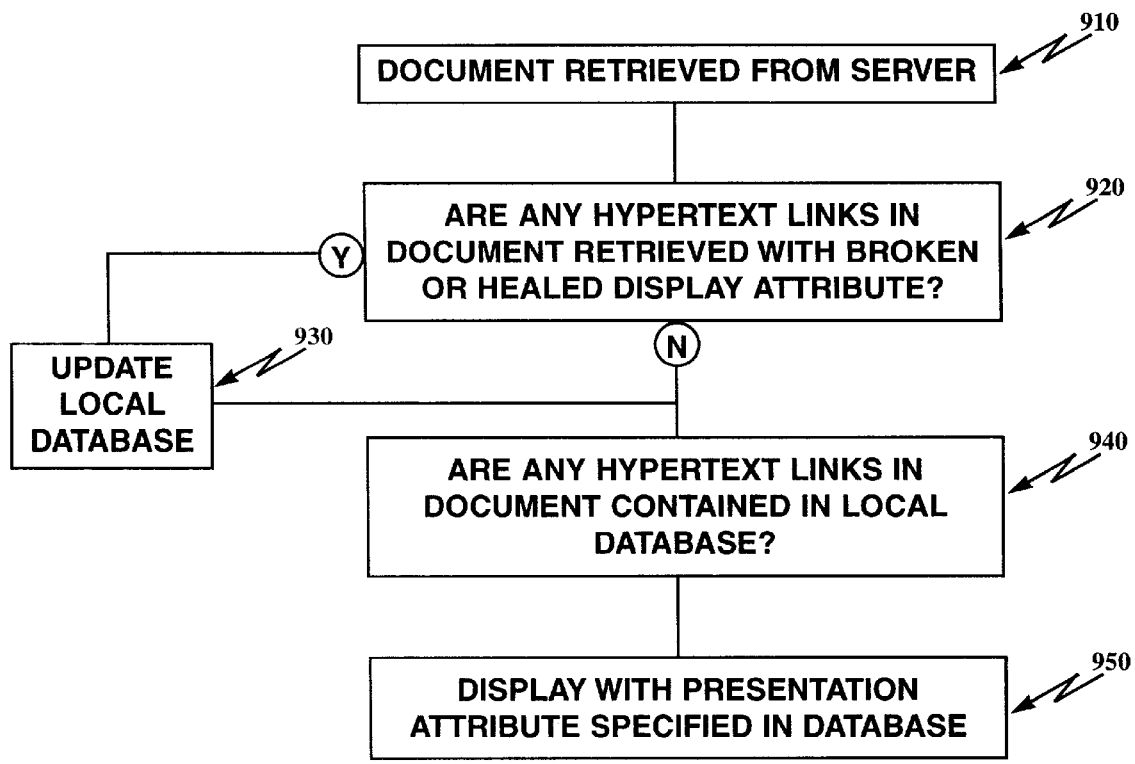
FIG. 9 is a flow chart of an exemplary process for changing a presentation attribute of a link of a retrieved document.

FIG. 9 is a flow chart of an exemplary process for changing a presentation attribute of links in a retrieved document on the client's side. When a document is retrieved from a server (910), a check of the downloaded mark-up language, such as HTML, is made to determine whether there are any information links in the document retrieved which have broken or healed display attributes. If there are (920-Y), the local database is updated to contain information about those links (930). If there are no such information links having broken or healed display attributes (920-N), a check is made to see if any of the information links in the document are contained in the local database (940). If they are, they are displayed with a presentation attribute appropriate to the broken/healed status specified in the database (950). In this way, broken and healed link information received from the server can be combined with that determined locally in the local database so that the link status information presented to a user reflects the latest information.

Figure 10:
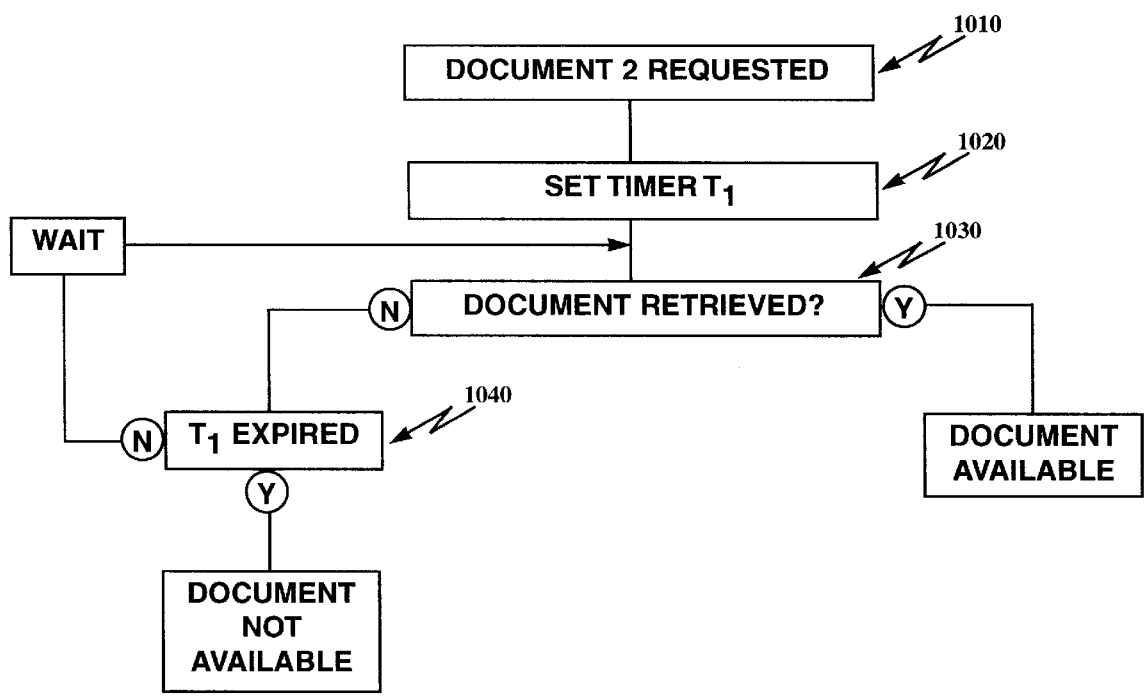
FIG. 10 is a flow chart of an exemplary process for determining whether a link is broken.

FIG. 10 is a flow chart of an exemplary process for determining whether a link is broken. When a document is requested (1010), a timer is set (1020) and a check is made to determine whether or not the document is being received (1030). If it is, the document is indicated as available (1030-Y). If it is not, (1030-N), a check is made to see if the timer has expired (1040). If it has not, (1040-N), after a certain period of time (1045), a check is repeated to see if a document is being received. If the timer has expired, (1040-Y), the document is considered not available (1030-N).

Figure 11:
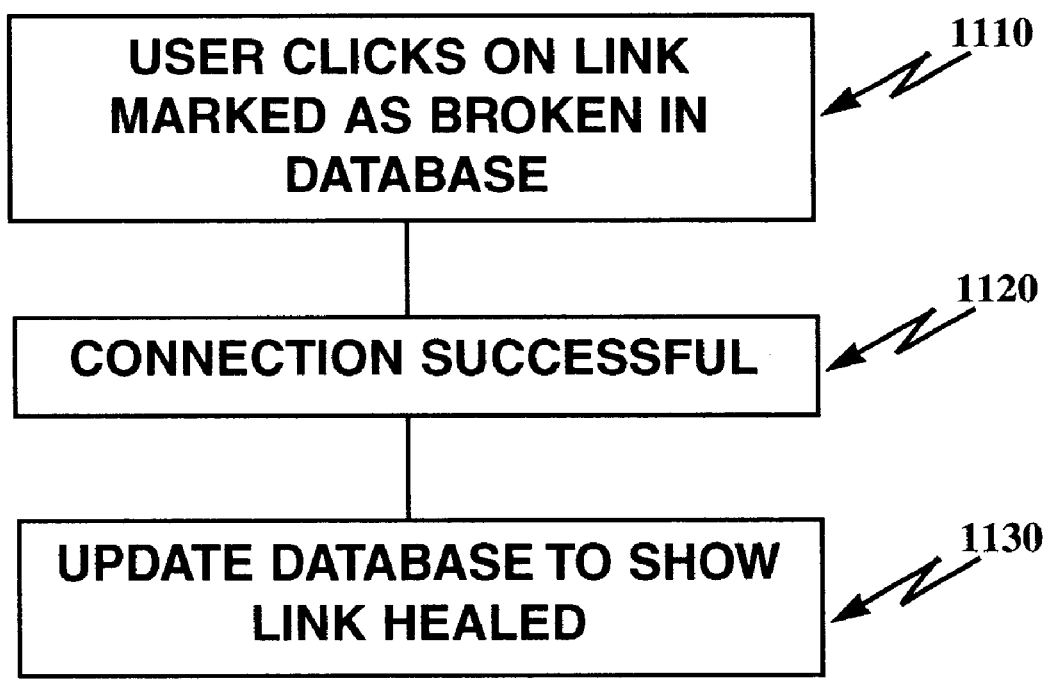
FIG. 11 is a flow chart of an exemplary process for determining if a link is healed at a client in accordance with one embodiment of the invention.

FIG. 11 is a flow chart of an exemplary process for determining if a link is healed at a server in accordance with one embodiment of the invention. When a user such as a Webmaster or maintenance person of a site clicks on a link marked as broken in the database (1110), if the connection is successful (1120), the database maintained will be changed to show that the link is healed (1130). This is a simplified version of the process shown in FIG. 7 which is preferred for use at a server.

FIGS. 12A and 12B represent an exemplary database layout for recording broken links and for gathering information on how well maintained a server site is. When a link has been reported as broken by a user to a server, the server can preferably maintain certain information about the broken link. This information is shown in FIGS. 12A and 12B. Field 1210 will store the identifier of the document located on the server containing the broken link. The broken link itself will be identified in field 1220. Field 1230 contains an indication of the number of attempts made to connect to the particular link identified as broken. These can either be attempts initiated by the server or the number of reports received from users in the message format, or both. Field 1220 is an indication of the number of attempts that were successful. This field is used mainly in conjunction with certain embodiments described hereinafter. The date and time of the first attempt (1250) and the date and time of the last attempt (1260) made to connect to the broken link are recorded. Field 1270 contains a list of each user reporting that that particular link is broken.

One use for field 1230 of database 1200 is to identify for a particular broken link, how many attempts have been made to connect to the site. If only one attempt by one user has failed, it may be desirable to indicate the relative uncertainty of the information with a particular presentation attribute for the link stored in a document at the site, such as attribute 1. If there were two attempts separated by more than an hour, there may be greater confidence that the link is broken and this may be indicated by a different attribute, such as attribute 2. If there were two or more attempts separated by twenty-four hours, it may be desirable to display the broken link with a different attribute, such as attribute 3. The time elapsed between a first and last report may be indicated by fields 1250 and 1260. Thus, different attributes may specify the degree of severity of outage of a broken link.

Figure 13:
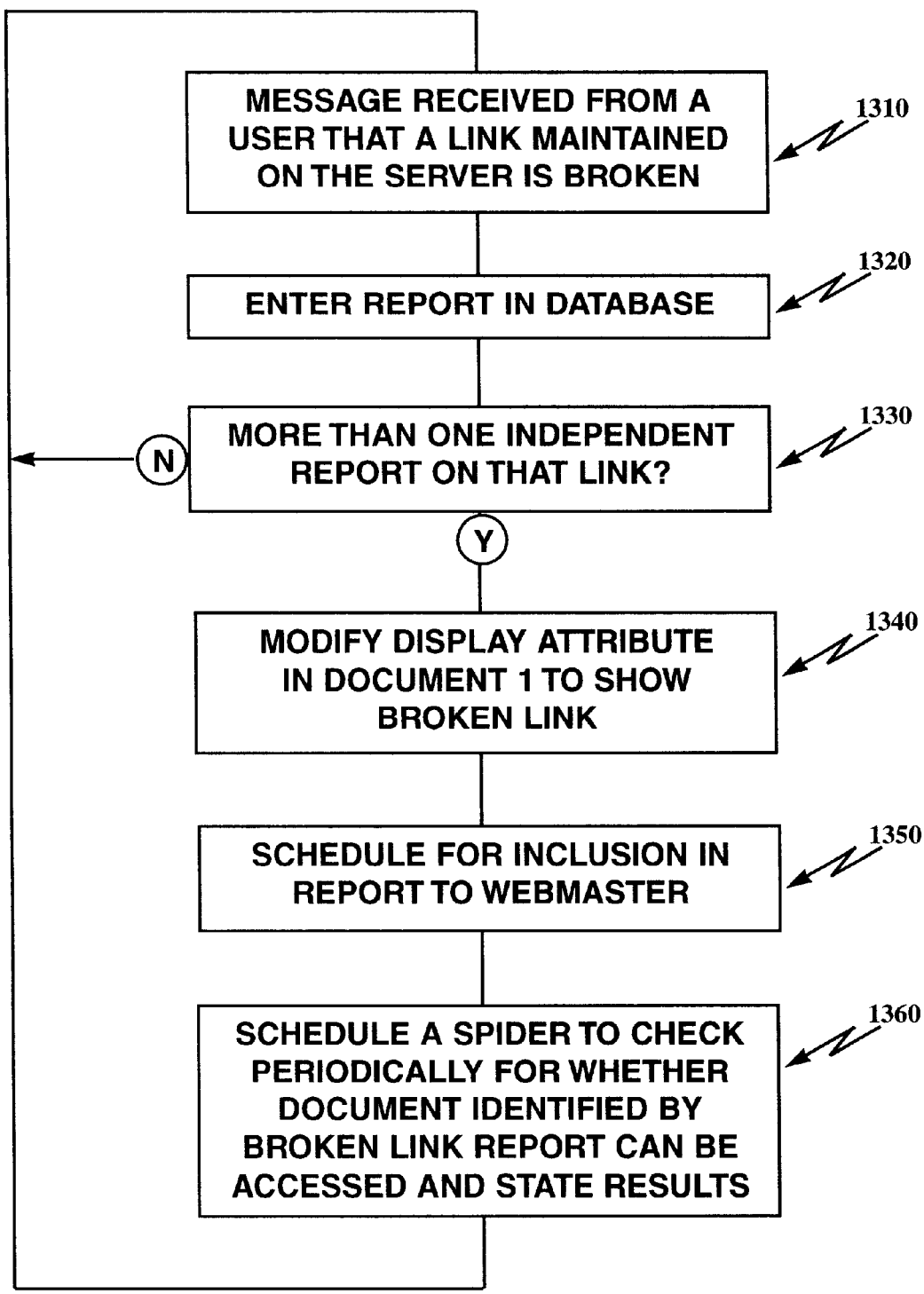
FIG. 13 is a flow chart of an exemplary alternative process for handling broken links in accordance with one embodiment of the invention.

FIG. 13 is a flow chart of an exemplary alternative process for handling broken links in accordance with an embodiment of the invention. When a message is received from a user that a link maintained on the server is broken (1310), this report is entered in the database (1320), such as the database shown in FIG. 12. If there is more than one independent report of a broken status for the link being reported (1330), the display attribute will be modified to show the broken link (1340). This broken link report can then be scheduled for inclusion in a report to the web master of the site containing the document having a broken link (1350). In addition, the report will trigger scheduling of a spider to check periodically for whether the document identified by the broken link report can be accessed and the result of that attempted access stored in the database (1360). If there is only one independent report of a broken link (1330-N), no action will be taken unless independent confirmation is received.

Figure 14:
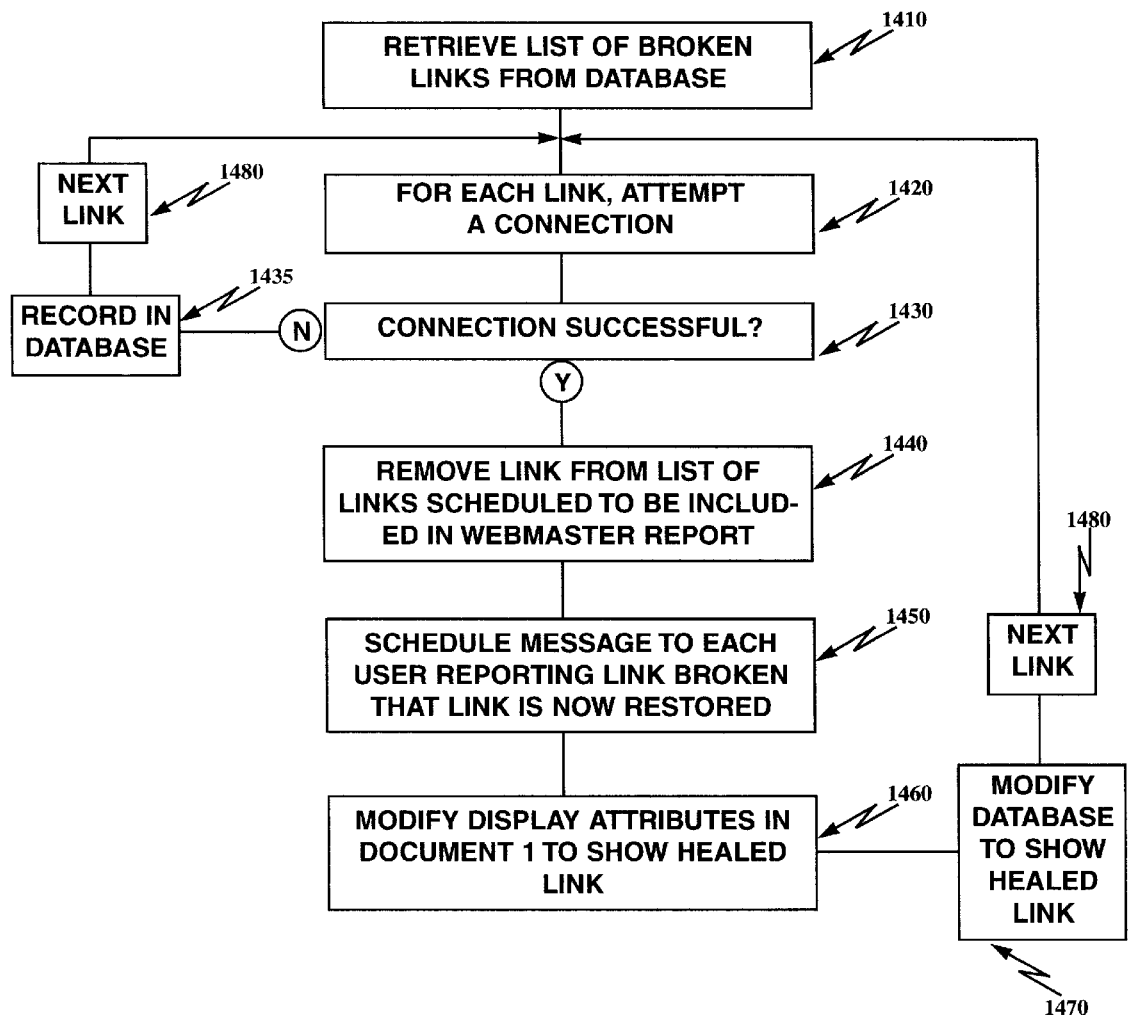
FIG. 14 is a flow chart of an exemplary spider process for periodically testing broken links.

FIG. 14 is a flow chart of an exemplary spider process for periodically testing broken links. The process retrieves a list of broken links from the database (1410), preferably the database shown in FIGS. 12A and 12B. For each link, the spider attempts a connection (1420). If the connection is not successful (1430-N), the database record is updated with information about the attempted connection (1435) and the next link is selected for processing (1480). If the connection is successful (1430-Y), the link can be removed from the list of links scheduled to be included in a Webmaster's report (1440) and, assuming a certain degree of confidence has been achieved that the link has been restored to operational status, a message can be scheduled to each user reporting that the link previously broken has now been restored (1450). A user, receiving such a message, may update the database to remove the broken link indication as previously discussed. In addition, the display attributes of the document successfully connected to can be modified to show that the link has been healed (1460). In addition, the database can be modified to show that the link has been healed (1470), and the next link selected (1480).

Figure 15:
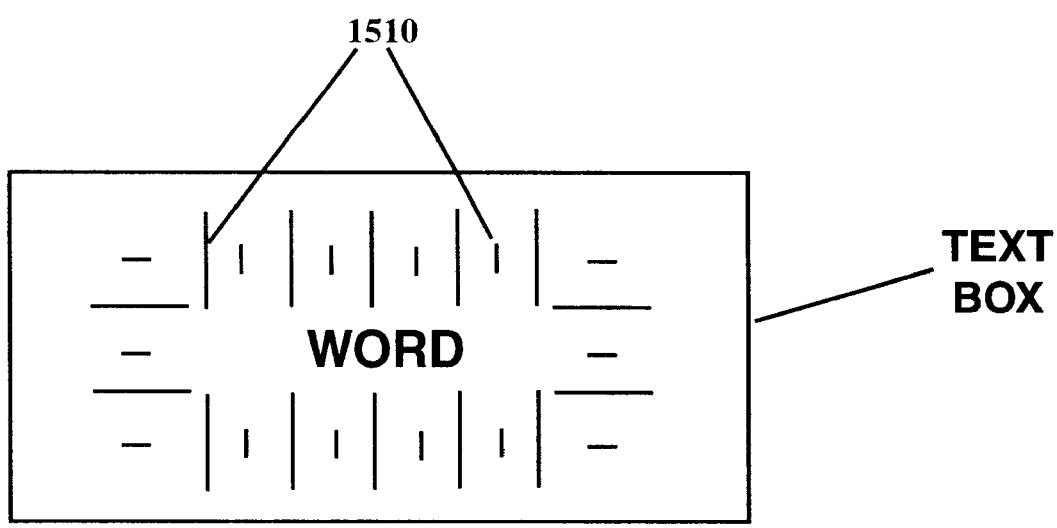
FIG. 15 is an illustration of a preferred way to display a healed link using sparkle.

FIG. 15 is an illustration of a preferred way of displaying a healed link using sparkle. When the word in a document containing an information link which has been healed is displayed, it is typically displayed in a text box. It is the presentation attribute of this word which is modified to reflect the broken or healed status of the information link. In the preferred form of the invention, a healed link is displayed by surrounding the word with highlights 1510 as indicated. In an exemplary form, each highlight is an embellishment which alternates between a first and second number of pixels, (such as 1 and 2 pixels in height (width)) on an ongoing basis, to give the word the appearance of being surrounded by sparkle. This animation calls the user's attention quickly to the healed link.

Figure 16:
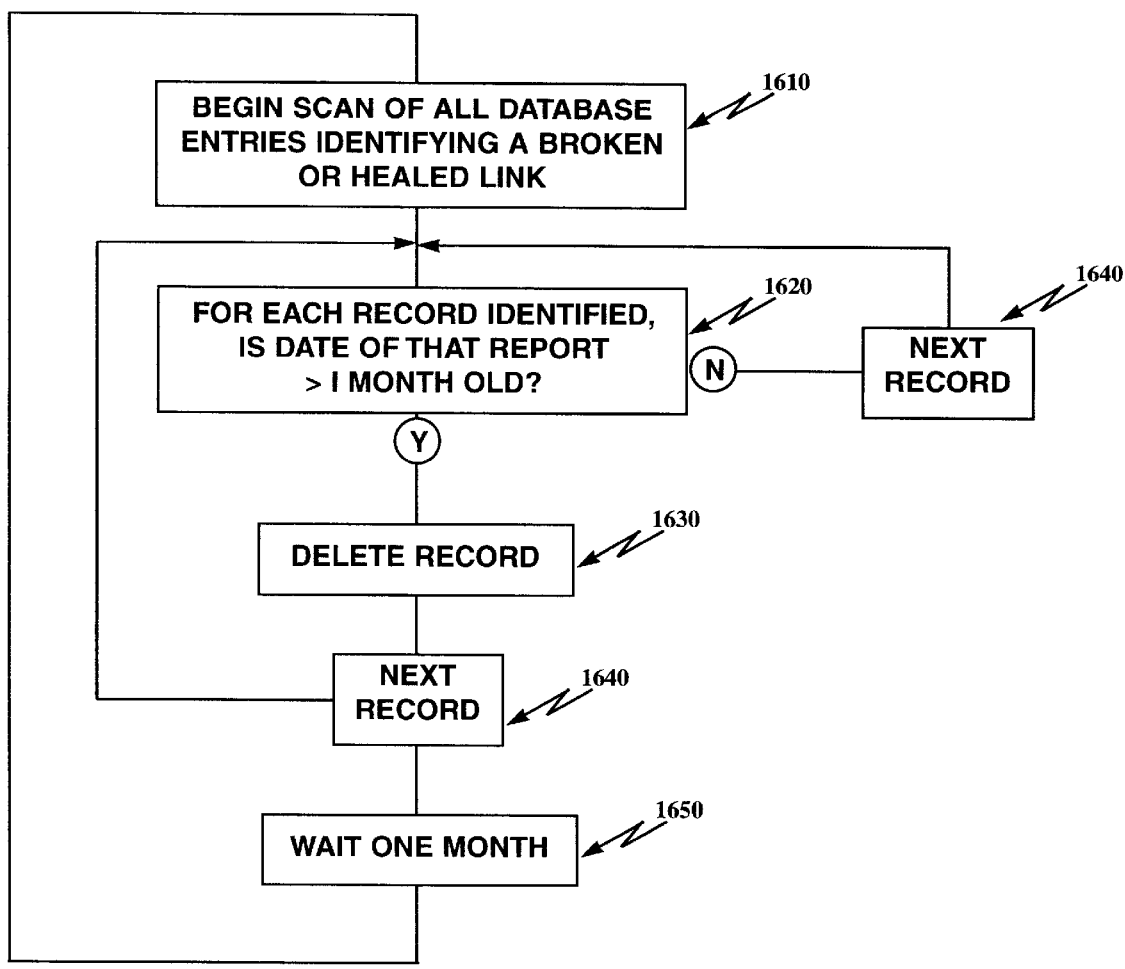
FIG. 16 is a flow chart of an exemplary process for cleaning up a database of broken links.

FIG. 16 is a flow chart of an exemplary process for cleaning up a database of broken links. This can be applied to either a user database or server database. Certain broken link reports result from sporadic events that may not be significant to a user once they reach a certain age. Thus, broken links which are older than a predetermined date, should be purged to avoid the accumulation of useless information. Similar considerations apply to a healed link. Periodically, one should begin a scan of all database entries which identify such links (1610). For each record identified, a determination should be made whether the date of the last report of its status is more than a certain period of time in the past, such as one month. If that date is older (1620-Y), a record should be deleted 1630 and the next record considered. If the date of the last report is less than the cut off age (1620-N), the next record will be selected for consideration (1640). When all records have been selected, a period of time will expire (1650), before old records are purged from the database again. The one month cut off date illustrated in the example of FIG. 16 is arbitrary and can be set to any duration desired by a user.

Figure 17:
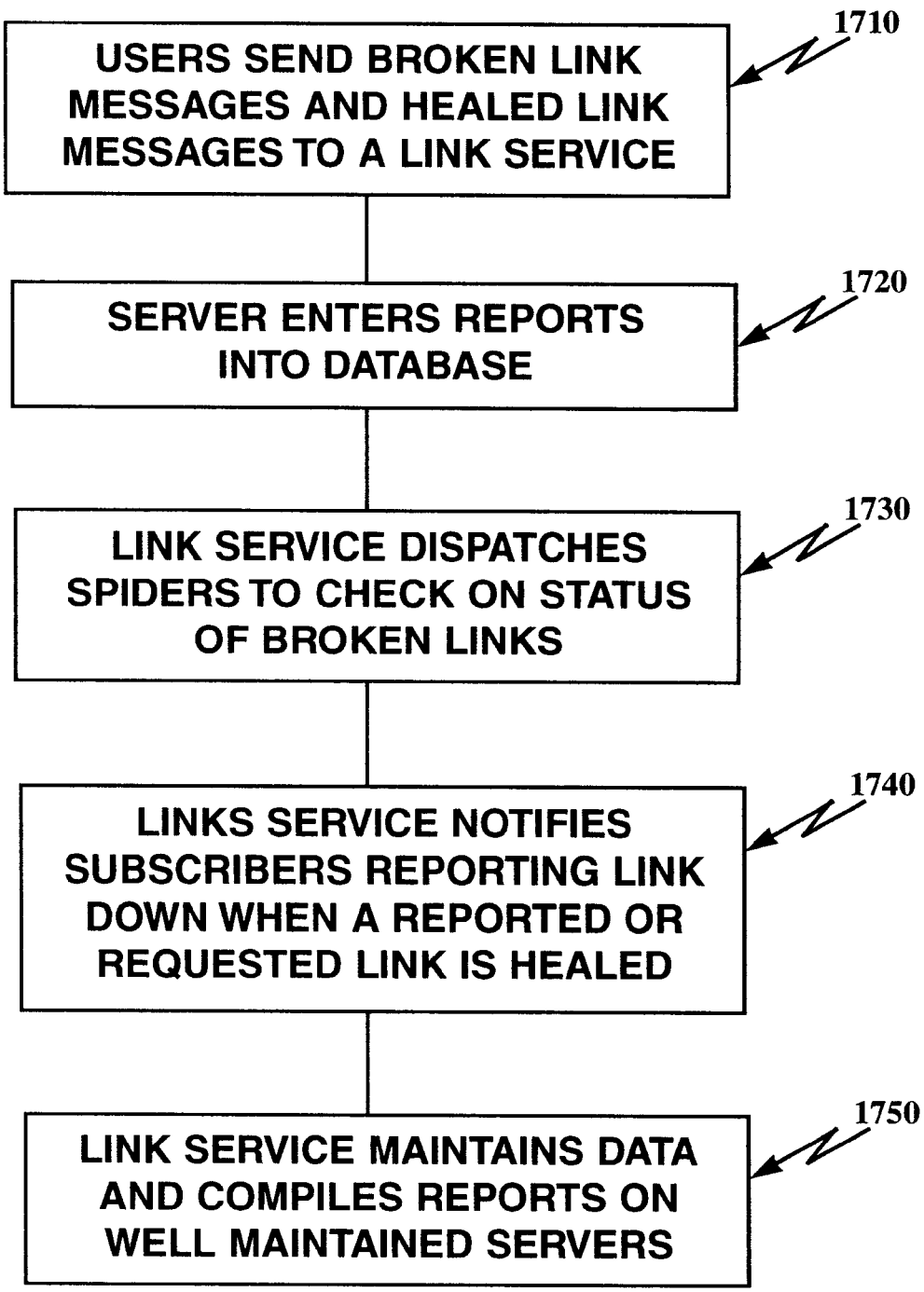
FIG. 17 is a flow chart of an exemplary process for running a centralized link reporting service in accordance with one aspect of the invention.

FIG. 17 is a flow chart of an exemplary process for running a centralized link reporting service in accordance with one aspect of the invention. Rather than utilizing a spider process at each server, it may be desirable to maintain a centralized server for processing broken link and healed link information. Such a service will maintain a database like that shown in FIGS. 12A and 12B. Users send broken link messages and healed link messages to the link service (1710) and the service server enters reports into the database (1720). The link service then dispatches spiders to check on the status of the broken links (1730). The link service also notifies subscribers who have reported a link down when a reported or requested link is healed (1740). In addition, the link service can maintain data and compile reports on well maintained servers based on the information they maintain in their database (1750).

Figure 18:
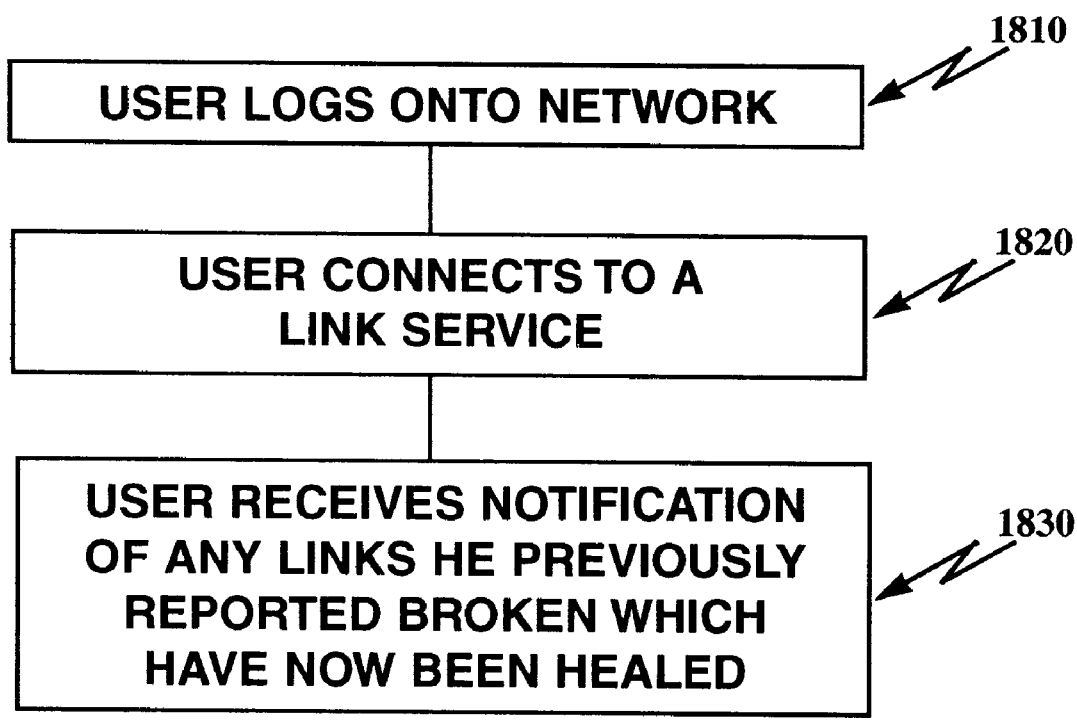
FIG. 18 is a flow chart of an exemplary process at a client for using a centralized link reporting service.

FIG. 18 is a flow chart of an exemplary process for use at a client to utilize a centralized link reporting service. When a user logs on to the network (1810), a user will be connected to a link service (1820) like that described in conjunction with FIG. 17. The user may then receive notification of any links he previously reported broken which have now been healed (1830). The central service approach has the benefit that the collective experience of users reporting to the common service can be utilized to identify broken and healed links.

Figure 19:
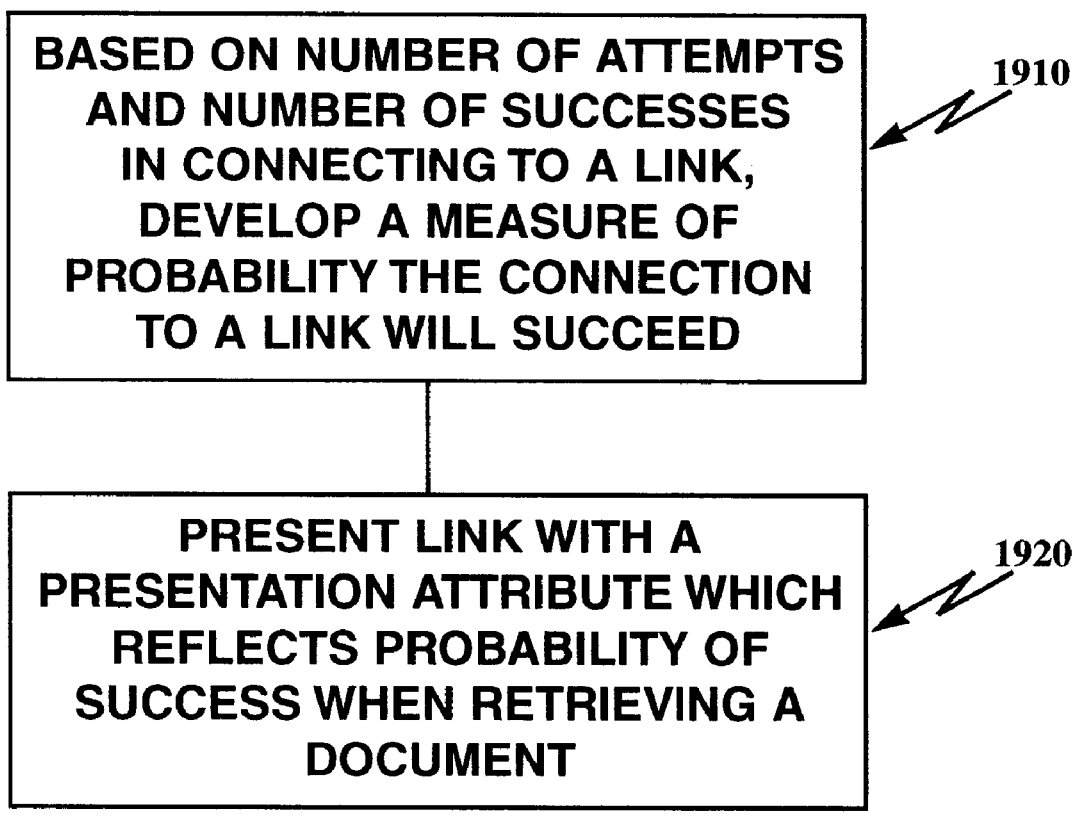
FIG. 19 is a flow chart of an alternative process for changing a display attribute for a link based on a probability that a connection to that link would succeed.
Figure 20A:
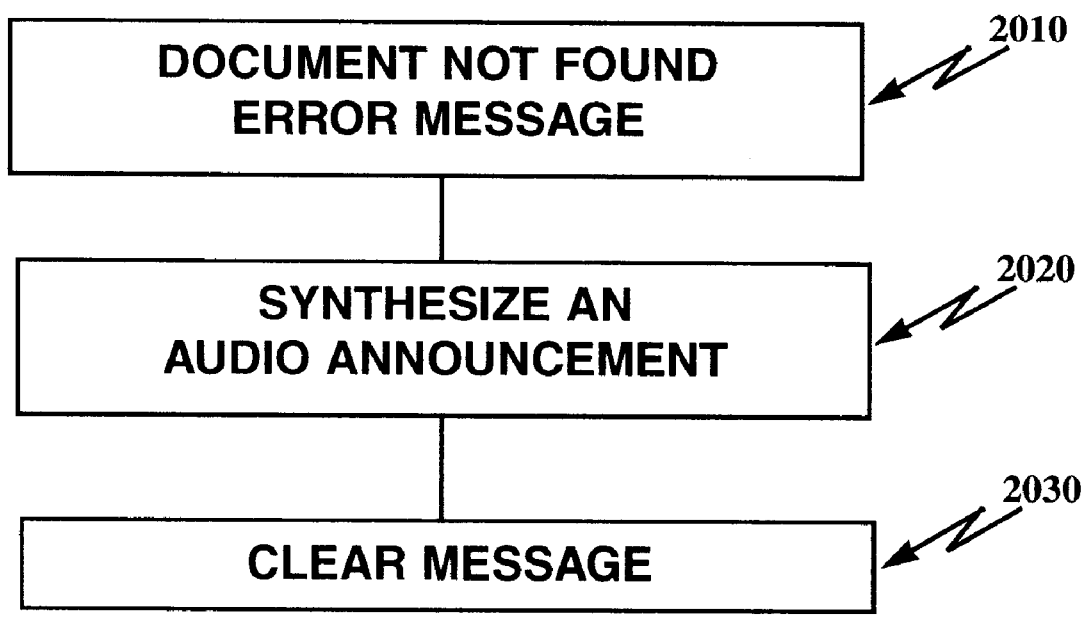
FIGS. 20A, 20B and 20C are exemplary flow charts of different processes for automatically removing document not found error messages.
Figure 20B:
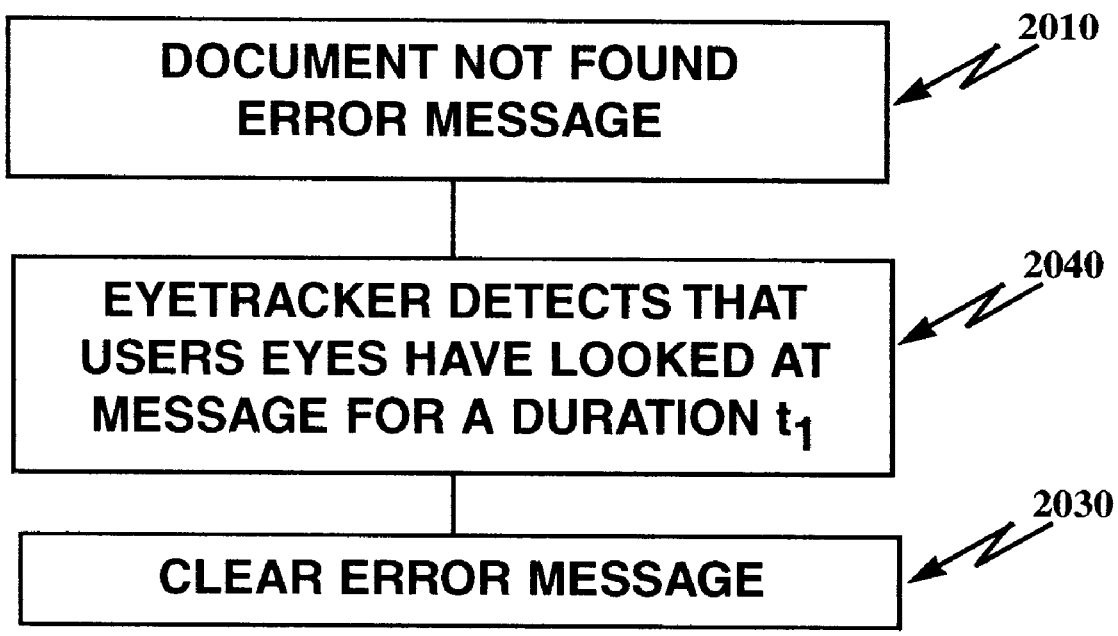
Figure 20C:
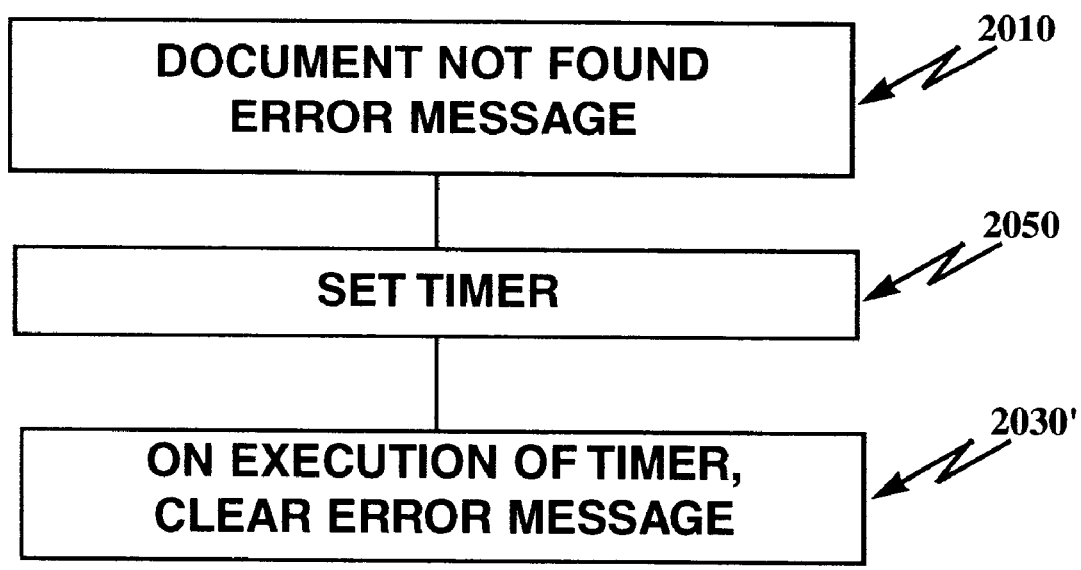

FIG. 19 is a flow chart of an alternative process for changing a display attribute for a link based on a probability that a connection to that link would succeed. In this approach, when determining the particular display or presentation attribute to be applied to an information link, it may be based on the number of attempts and the number of successes in connecting to that link. This can be utilized to develop a measure of probability that connection to a particular link will succeed (1910). The link may then be presented with a presentation attribute which reflects the probability of success when retrieving a document identified by the information link (1920). One should note that presentation is more general than display. It may be desirable to present information about a link and various ways, such as visual, audible or tactile. This presentation attribute can be modified to distinguish the same characteristics discussed in the various presentation media. FIGS. 20A, 20B and 20C are exemplary flow charts of different processes for automatically removing document not found error messages. One of the problems encountered with the document not found error message is that it affirmatively requires a user action to clear it. Typically, this involves centering a cursor over a "OK" button and clicking on that button to remove the message from the screen. This is singularly inconvenient for users when navigating an information space. It is particularly inconvenient because of the large number of broken links. In FIG. 20A, when an document not found error message is generated (2010), it is not displayed on the screen but rather is synthesized as an audio response (2020) following which, if a visual message was displayed, it is automatically cleared (2030).

Another approach is illustrated in FIG. 20B. When the document not found error message is displayed (2010), an eyetracker (e.g. 176) is utilized to detect that the user's eyes have looked at the message for a duration, such as T1 (2040). T1 would typically be sufficiently long for a user to be able to read the message, following which the error message would be cleared from the screen permitting the user to continue without the physical action necessary to clear the message of the prior art.

In a third approach, when the document not found error message is displayed (2010), a timer is set (2050) following expiration of which, the error message is cleared automatically (2030).

In the manner indicated, the problems as found in the prior art with the respect to the handling of document not found error messages are significantly alleviated and user experience in navigating an information space is greatly enhanced.

Although the present invention has been described and illustrated in detail, it is clearly understood that the same is by way of illustration and example only and is not to be taken by way of limitation, the spirit and scope of the present invention being limited only by the terms of the appended claims and their equivalents.

What is claimed is:

1. Computer apparatus, comprising:
   a. a communications interface; and
   b. a computer, connected to said communications interface, configured to detect an indication that a document requested over said communications interface using an information link has not been found, to store information indicating said link was not found, to change a presentation attribute of said link when said link is contained in a document received over said communications interface, and to modify said presentation attribute when a successful connection to said document is achieved.

2. The computer apparatus of claim 1 in which said computer is further configured to delete said information indicating said link was not found when a successful connection to said document is achieved.

3. The computer apparatus of claim 1 in which said computer is further configured to send a message to a server from which a document was retrieved which contained said information link indicating that a document requested using said information link was not found.

4. The computer apparatus of claim 1 in which said computer is further configured to change the presentation attributes of information links contained in documents received over said communications interface when information is stored about one or more of said links.

5. The computer apparatus of claim 4 in which said computer is further configured to send a message to a server indicating that a document was successfully retrieved using an information link which had previously been the subject of a message to said server.

6. Computer apparatus, comprising:
   a. a communications interface; and
   b. a computer, connected to said communications interface, configured to receive at least one message over said communications interface identifying a document stored on said computer, and to modify a presentation attribute of at least one information link contained in said document in response to said message.

7. The computer apparatus of claim 6 in which said computer is further configured to store information about information links received in messages over said communications interface.

8. The computer apparatus of claim 6 in which said messages comprise reports that an information link contained in a document stored on said computer apparatus did not result in a connection.

9. The computer apparatus of claim 6 in which said messages comprise reports that an information link contained in a document stored on said computer apparatus did result in a connection after having been previously reported as not resulting in a connection.

10. The computer apparatus of claim 6 in which the information about information links is stored in a database.

11. The computer apparatus of claim 6 in which said computer is further configured to run a spider process the check on the status of information links contained in documents stored on said computer apparatus.

12. The computer apparatus of claim 6 in which said computer is further configured to run a spider process the check on the status of information links contained in documents stored on said computer apparatus reported to be broken.

13. The computer apparatus of claim 6 in which said computer is further configured to send a message to any computer reporting a broken information link indicating that the link previously reported as broken has been healed when at least one message has been received indicating successful access to a document identified by said information link.

14. A system for information retrieval, comprising:
   a. a network;
   b. at least one server computer apparatus, connected to said network, storing documents and configured to deliver a document across the network in response to a document request; and
   c. at least one client computer apparatus, connected to said network, configured to send a message to a server computer apparatus from which a document containing an information link was received when a document requested using said information link was not found.

15. A method of handling information links which do not result in retrieval of a document pointed to by the information link, comprising the steps of:
   a. detecting an indication that a document requested using an information link has not been found; and
   b. sending a message to another device indicating said link was not found.

16. A method of storing information about information links which are not functioning, comprising the steps of:
   a. receiving a message indicating an information link contained in a document is not working;
   b. retrieving said document;
   c. modifying a presentation attribute of said information link in said document; and
   d. storing said document in modified form.

17. A method of gathering information about non-functional information links in documents stored on network devices, comprising the steps of:
   a. receiving messages at a network device from one or more network devices indicating that a particular information link pointing to a different network device is not functioning; and
   b. storing information from said messages.

18. A computer program product comprising:
   a. a memory medium; and
   b. a computer program stored on said memory medium, said computer program comprising instructions for detecting an indication that a document requested using an information link has not been found and for sending a message to another device indicating said link was not found.

19. A computer program product comprising:
   a. a memory medium; and
   b. a computer program stored on said memory medium, said computer program comprising instructions for receiving a message indicating an information link contained in a document is not working, for retrieving said document, for modifying a presentation attribute of said information link in said document and for storing said document in modified form.

20. A computer program product comprising:
   a. a memory medium; and
   b. a computer program stored on said memory medium, said computer program comprising instructions for receiving messages at a network device from one or more network devices indicating that a particular information link pointing to a different network device is not functioning and storing information from said messages.

* * * * *